Patented Aug. 27, 1946

2,406,319

UNITED STATES PATENT OFFICE 2,406,319

INSULATED ELECTRICAL CONDUCTOR

Lester A. Brooks, Stamford, Vt., and Mathew Nazzewski, Adams, Mass., assignors to Sprague Electric Company, North Adams, Mass., a corporation of Massachusetts No Drawing. Application November 19, 1943, Serial No. 510,918

10 Claims. (Cl. 117—128.4)

This invention relates to electrical conductors insulated with improved dielectric compositions containing polymers of halogenated styrene and more particularly refers to compositions containing certain of said polymers and processes for their production and use.

It is well known that the polymer of styrene exhibits to a certain extent desirable electrical properties, in particular a low electrical loss, which results in a low power factor in an electrical condenser containing polystyrene as the dielectric material. The dielectric constant for this material is not high, being about 2.5.

However, styrene in its polymerized form possesses several undesirable characteristics. One of these is its relatively low softening point. It is softened at temperatures in the neighborhood of 75° C. When used as a dielectric material in electrical condensers, either as a film or as an impregnant, this low softening point is undesirable since the operating temperature or more particularly the "hot-spot" temperature may well exceed its softening temperature, causing the polystyrene to soften and flow. This flow may be attributed to the fact that most rolled or stacked condensers are under compression and the dielectric, if soft or liquid, tends to "squeeze out" from between the metal foils. This action causes bare or weak spots which may subsequently lead to sparking, corona and breakdown of the condenser.

Another of the undesirable characteristics of polystyrene is the action of moisture thereon. While polystyrene will not itself absorb moisture, it will transmit moisture from one point to another quite readily. If used in an electrical condenser, the presence of moisture between the metal electrodes will cause an undesirable increase in power factor. Further, the presence of moisture may well lead to damaging chemical reactions, such as the formation of metal hydroxides on the foil. For this reason, electrical devices employing polystyrene must be carefully dried and sealed.

In recent years research has been directed to the manufacture of polystyrene type resins with higher softening points. Various alkyl groups, such as methyl, ethyl, etc., have been substituted on the nucleus, as well as halogen and other elements on the side chain. Some of these resins possess higher softening points but their electrical properties leave much to be desired.

It is an object of this invention to produce new styrene compounds which when polymerized possess outstanding physical and electrical properties. It is a further object to produce new dielectric compounds which possess high dielectric constants, low electrical losses, high resistance to moisture transmission and relatively high softening points. Another object is to produce new polymers of dichloro-styrenes, in which the chlorine atoms are in positions on the nucleus ortho to each other. An additional object is to produce new fluorinated styrene compounds. Still another object is to produce new fluoro-chloro styrene compounds. These and additional objects will become apparent from a consideration of the following description and claims.

In accordance with this invention, certain halogenated styrenes, particularly fluorinated and/or chlorinated styrenes, are polymerized and the products used as dielectric compositions. In a more restricted sense this invention is concerned with ortho-dichloro-, -di-fluor- and/or -chlor-fluor styrene, polymerized and used as dielectrics with or without the addition of fillers, plasticizers, hardeners, inhibitors, accelerators and/or other polymerization additives. In its preferred embodiment the invention is concerned with the foregoing compounds and/or mixtures thereof wherein the halogen groups are substituted on the 3- and 4-positions in the styrene nucleus. The invention also pertains to condensers, coated electrical conductors and other electrical devices containing the foregoing and related polymers as the sole or partial component of their dielectric compositions. Likewise, it is directed to processes for producing the foregoing monomeric materials.

It has been found that among the halogenated monomeric styrene derivatives, certain compounds exhibit surprisingly superior electrical properties when in the polymerized form. These are 3:4 dichloro-styrene, 3:4 difluoro-styrene, 3-chloro-4-fluoro-styrene and 3-fluoro-4-chloro-styrene. When polymerized these compounds, and to a lesser extent the corresponding 2-3-styrenes, possess a high dielectric constant, very low electrical loss (power factor), relatively high softening point and a very high resistance to the transmission of moisture. This may be attributed in part to the fact that when the chlorine or fluorine atoms are situated on the ring in positions which are ortho to each other, a very high electrical moment and dielectric constant, as well as the other unusual properties described above, are obtained. For this reason, the dichloro, difluoro, and fluoro-chloro monomers and polymers in which the halogen atoms are in ortho positions to each other on the styrene ring are preferred embodiments of the invention. The polymers of similar difluoro compounds are generally more stable in an electrical field than the corresponding chlorine compounds, and for this reason are of outstanding value. The difluoro styrenes do not, however, polymerize as readily as the dichloro styrenes, which in some cases is an advantage, as will be hereinafter mentioned.

Other compounds of this invention which have been found to possess superior electrical properties are the polymers of ortho-, meta- and para-chloro and fluoro-styrene, as well as other isomers of dihalogenated styrenes, such as 2,4 dichlorostyrene, 2,6-dichloro-styrene, 2,5 dichloro-styrene, etc. The various isomers of fluoro-chloro styrene have been found to be quite suitable, with an intermediate ease of polymerization and a high stability in an electrical field. Among these, the monomers in which the fluorine and chlorine atoms are in positions on the ring ortho to each other are preferred, as mentioned heretofore. Likewise, tri-halogeno-styrenes corresponding to the foregoing may be used, such as trichlor styrene having adjacent chlorine atoms, etc.

While pyrolysis of an ethyl benzene derivative may be used to obtain the styrene derivative, other syntheses are described herein, which do not require elevated temperature and/or pressure to obtain the desired styrene derivative monomer.

The first general method which may be used to synthesize these compounds is to start with a chloro-, fluoro-, dichloro-, difluoro- or fluoro-chloro-benzaldehyde and react this with a Grignard reagent, such as methyl magnesium chloride, in ether solution to produce, e. g., a chloro-, fluoro-, dichloro-, difluoro- or a fluoro-chloro-phenyl methyl carbinol, respectively. This compound is dehydrated by one of several methods, for example, by dropping the carbinol onto fused potassium bisulfate and heating the mixture. Dehydration occurs and the chloro-, fluoro-, dichloro-, difluoro-, or the fluoro-chloro-styrene formed is removed and purified by distillation.

The second general method is to react a chloro-, fluoro-, dichloro-, difluoro- or a fluoro-chloro-benzene with acetyl chloride and/or acetic anhydride in the presence of anhydrous aluminum chloride to produce, upon extraction and purification, a ring-halogenated acetophenone, such as 3,4-dichloro acetophenone where the starting compound was ortho-dichloro benzene. This product is treated with aluminum isopropoxide and isopropyl alcohol. The product therefrom is extracted with benzene and purified by distillation to give a ring halogenated phenyl-methyl-carbinol such as 3,4 dichlorophenyl-methylcarbinol in the case mentioned above. The compound is then dehydrated to give a ring halogenated styrene, such as 3,4 dichlor styrene.

The third general method which may be used is to nitrate ethyl benzene, reduce the nitro group or groups to an amino group or groups, replace the so-formed amino group or groups by chlorine or fluorine, by standard methods. The resulting compound, for example, para fluoro-ethyl benzene is chain chlorinated to form alpha chloro ethyl para fluoro benzene. This compound is then dehydrohalogenated to produce para fluoro styrene. In this method, the formation of the beta chloro derivative is also satisfactory inasmuch as the end product is the same. Another modification of the same synthesis would involve the catalytic dehydrogenation of the ethyl derivative to form the desired styrene.

The fourth general method is the alkylation of a halogenated benzene, for example, fluoro-benzene using ethyl chloride or ethylene in the presence of a condensing agent such as aluminum chloride. The resulting fluoro-alkyl-benzene may be subsequently treated as in the synthesis described above, to form the fluoro styrene derivative desired.

It is to be understood that these methods for reduction, dehydration, etc., are but a few of many which are applicable. In like manner different Grignard reagents may be used such as methyl magnesium bromide or iodide. For reduction, for example, catalytic hydrogenation may be used. For the dehydration process, the unsaturated vinyl chain might be obtained by heating at a high temperature with or without pressure; by heating with alcoholic potash; by heating with excess sulfuric acid; by heating with zinc chloride; by heating with phosphorous pentoxide; passage of the alcohol over alumina or tungsten oxide at 250–400° C.; distillation of the benzoic ester of the carbinol; or by other suitable chemical means, all under favorable controlled conditions, well known to one familiar with this art.

It is further to be understood that the mono- and difluoro-, the chloro- and dichloro- and the fluoro-chloro-styrenes, as well as mixtures thereof, may be manufactured by the above general methods by selection of the proper benzene or benzaldehyde derivatives with which the syntheses are begun.

To further clarify the methods of obtaining the aforementioned styrene derivatives, the following descriptive examples are included.

EXAMPLE 1

*Preparation of ortho-chloro styrene*

Ortho-chlor benzaldehyde is treated with the Grignard reagent of methyl bromite in ether solution to give o-chlor-phenyl methyl carbinol, having a boiling point of 109° C. at 7 mm. This carbinol is then dehydrated by adding it dropwise on a bed of fused powdered potassium bisulfate, the latter being in a flask. The flask is then heated until the chloro-styrene vapors come off. The vapors are swept out of the flask by an inert gas, such as nitrogen, and cooled and collected in a separate container. The product thus obtained is washed with dilute sodium hydroxide and calcium chloride; then is dried over calcium chloride and redistilled. Pure o-chlor styrene is thus obtained, having a boiling point of 60–61° C. at 7 mm.

Ortho-, meta-, and para-fluor styrene may be made from the corresponding fluor compounds in accordance with the above example.

EXAMPLE 2

*Preparation of m-chloro styrene* m-Chlor acetophenone is reduced by adding about one part of aluminum propoxide and 10 parts of isopropyl alcohol to one part of the acetophenone, heating for about six hours, during which time acetone-isopropyl alcohol distills off, acidifying the remainder with hydrochloric acid and then extracting with benzene. The reduced product thus obtained is chloro-phenyl methyl carbinol, having a boiling point of 106° C. at 6 mm.

This carbinol is dehydrated as in Example 1, and subsequently washed, dried, redistilled, etc., to give as a pure product meta-chlor styrene, having a boiling point of 62–63° C. at 6 mm.

Likewise, other mono-chloro and mono-fluoro styrenes can be obtained by either of the methods of Examples 1 and 2.

EXAMPLE 3

Preparation of 2,5 dichloro styrene 2,5 dichloro benzaldehyde is treated with the Grignard reagent of methyl bromite in ether solution. After working up the product in the usual manner, 2,5 dichlorophenyl methyl carbinol is obtained. The carbinol thus prepared is then dehydrated by adding it dropwise on a bed of potassium bisulfate, as is explained in Example 1. Pure 2,5 dichlorostyrene is produced, having a boiling point of 72° C. at 2 mm.

EXAMPLE 4

Preparation of 3,4 dichloro styrene

Ortho dichloro benzene and anhydrous aluminum chloride is slowly treated with acetyl chloride, continuous agitation being provided. The mixture is then heated at 100° C. for several hours. The reaction mass is poured on ice and extracted with carbon tetra-chloride. The extract is purified by distillation to give 3,4 dichloro acetophenone of boiling point 135° C. at 12 mm. A mixture of aluminum isopropoxide and dry isopropyl alcohol is added to the 3,4 dichlor acetophenone, the mixture being treated as described in Example 2 to give the desired 3,4 dichlorophenyl methyl carbinol. This carbinol is then dehydrated as in Example 2 to give 3,4 dichlorostyrene, having a boiling point of 70° C. at 4 mm.

By analogous methods the other dichlor, di-fluoro and chloro-fluoro styrenes may be obtained with satisfactory yields.

The various halogenated styrene derivatives mentioned above may be readily polymerized by heat. The preferred compounds of this invention, namely, ortho-dihalogenated styrene derivatives polymerize very readily. The order of ease of polymerization in decreasing order is as follows: The dichloro styrenes, the chloro-fluoro styrenes, the di-fluoro styrenes, the mono-chloro styrenes, the mono-fluoro styrenes. The polymers produced from the above pure monomers are glass-like and in most cases clear. The surfaces are fairly hard and durable and the physical properties are greatly superior to pure polystyrene.

The polymerization of the monomers may be accelerated by the action of one or more of the following agents: Heat, light, benzoyl peroxide, oxygen, boron tri-fluoride, tin tetrachloride, sulfuryl chloride, zinc chloride, halogens, carbon dioxide, sulfur, carbon disulfide, thiophenol, thiocresol, activated charcoal or carbon, aluminum chloride and other related or effective accelerating agents.

It may be desired to inhibit the polymerization for various purposes. This may be done by use of one or more of the following agents in small amounts, benzoquinone; sulfur; trinitrobenzene; anthracene; phenols such as cresol, hydroquinone and pyrogallol; and other inhibitors. Where the monomer is to be stored for long periods, it is often advisable to use such inhibitors.

The addition of accelerating or inhibiting agents is generally in small amounts, inasmuch as their action is of a catalytic nature, rather than additive.

A preferred embodiment of this invention is the co-polymerization of two or more of the halogenated styrene derivatives mentioned above. It may be desired to combine the properties of two or more of the compounds and this can be readily accomplished by admixture of the polymers or by co-polymerization of the monomers and/or partially polymerized materials. It is to be understood that polymerizable materials other than those previously described herein may be included in the foregoing mixtures. For example, monomeric and/or partially polymerized vinyl carbazole and/or related materials may be included in the foregoing mixtures with excellent results.

A representative few of the mixtures referred to previously may be produced through the co-polymerization or other combination of one or more of the heretofore described compounds produced in accordance with this invention and one or more of the following or related monomers or polymers thereof: Acrylic alcohol and esters thereof, such as methyl acrylate and methyl methacrylate; styrene and derivatives thereof other than those described heretofore; maleic anhydride; olefins such as isobutylene; diolefins such as butadiene; vinyl chloride, vinylidene chloride, vinyl ethers and esters; acrylonitrile, acrylyl chloride; unsaturated ketones such as methyl vinyl ketone; unsaturated alpha, beta dicarboxylic acids; substituted benzenes; vinyl pyrrole monomers, such as N-vinyl pyrrole, 3-chloro-N-vinyl carbazole, N-vinyl carbazole, N-vinyl indole, etc.; indene; and numerous other materials which will copolymerize or combine with styrene.

A number of other compounds excellently adapted for copolymerization with the foregoing materials are described in copending applications, Serial No. 475,051, filed on February 6, 1943, by Brooks, Serial No. 480,137, filed on March 23, 1943, by Robinson, and Serial No. 507,276, filed on October 22, 1943, by Robinson and Dorst.

Among the outstandingly desirable copolymers are N-vinyl carbazole and para-fluoro-styrene; vinyl carbazole and 3,4 difluoro-styrene; 3-chloro-carbazole and 3,4 dichloro styrene; and, in general vinyl carbazole and/or derivatives thereof with one or more of the halogenated styrenes of this invention.

As an example of the simple polymerization of the pure monomer, 3,4 dichlor styrene is heated at its boiling point. In a few minutes the liquid had become viscous, and in a few more minutes a hard, clear resin was formed. The contraction upon polymerization is negligible.

As another example of simple polymerization of the pure monomer, para-fluorostyrene is heated to its boiling point. In approximately one hour a clear, hard mass is obtained, having unusual characteristics. Practically no contraction occurred during polymerization.

The copolymerization of 3,4 dichlorstyrene and N-vinyl carbazole may be advantageously carried out with the use of a small amount of a suitable solvent, such as amyl naphthalene or a similar compound. The presence of solvent seems to facilitate the polymerization reaction.

The polymers and copolymers heretofore mentioned may be used for a variety of purposes. While they are particularly suitable for use in electrical condensers, ceramic coated wires, and other electrical equipment, they are useful in other fields, such as in the molding of various articles, for example, toilet articles, chinaware, toothbrush handles, furniture, as a wood and/or metal substitute, hardware, etc.; in the production of paints, lacquers, enamels, varnishes, etc.; in lighting fixtures, ultraviolet transmitting windows, edge-lighting signs, etc.; in the formation by extrusion of filaments and fibers for textiles, bristles, window screening, etc.; in the molding of buttons, buckles, etc.; for use on textiles where heat, crease and moisture resistance is desired; as a binder for plywood, cardboard paper, etc.; as a material for film and sheet formation, for use in wrapping foods and sealing containers, etc.

Another embodiment of this invention concerns the use as dielectric materials of mixtures of the polymers of this invention with chlorinated biphenyls, chlorinated naphthalenes and other dielectric compounds which are not true polymers.

In particular, the products hereof are useful in the electrical field as dielectric and molding compounds by virtue of their heretofore mentioned low power factor, high leakage resistance and breakdown strength, fairly high dielectric constant, etc.

More specific uses in the electrical field are, for example, coil forms, stand-off insulators, insulating rods and bushings, coil mounting strips, insulating beads for coaxial cable and similar applications. Used as an ingredient in special preparations, these products are useful for coating and treating coils and circuit parts for moisture resistance. These products when hydrogenated or otherwise saturated to prevent further polymerization have applications as a cable oil or condenser dielectric, cable impregnant or wire saturant.

It is, of course, understood that some of these materials are more suitable as dielectric compounds than others. One of the preferred single compounds for this purpose is the polymer of 3,4 dichloro styrene. Condensers may be impregnated with 3,4 dichloro styrene in the monomeric form by distilling the compound under vacuum over to an evacuated chamber in which are packed dried condenser units. The dry units and the chamber about them act as a condenser for the 3,4 dichloro styrene vapor, and the units are thoroughly impregnated with it. The chamber may be subsequently subjected to elevated temperature and/or pressure to polymerize the 3,4 dichloro styrene in situ. Following removal from the chamber the impregnated units may, if desired, be dipped in or otherwise coated with the foregoing resins or with polymerized vinyl carbazole or related resins to render them completely moisture-proof, or a mixture of polymerized vinyl carbazole and finely ground mica may be used as a molding compound to encase the condenser unit. Other customary means can be used for impregnation with satisfactory results. Excellent results have been obtained by impregnating the condensers in accordance with the instructions of application Serial No. 489,475, filed June 3, 1943, by Beverly. Condensers formed in accordance with the invention described herein possess a relatively high capacity, low leakage, high breakdown voltage, low power factor and satisfactory moisture resistance. Rolled paper, stacked mica, and other types of condensers may be thus produced, with excellent results.

Rolled condensers may be made of metal foil and sheets or films of the polymers referred to previously, i. e., the condenser is produced by rolling alternate sheets of polymer and foil in the usual manner. These and other condensers may also be impregnated and/or coated with the same or related polymeric materials, if desired.

It is to be understood that in producing condensers of the foregoing type aluminum and other conducting metals may be vaporized under vacuum and deposited on the resin dielectric. The resulting sheets may be rolled or stacked, as desired, to form surprisingly satisfactory condensers.

In cases where the aforesaid halogenated styrene polymers are used for non-dielectric purposes it is generally advisable to incorporate therewith plasticizers and other materials, i. e., various fillers such as wood, flour, ground mica, rubber, talc, asbestos, zinc oxide, titanium dioxide, quartz and the like and/or organic or inorganic color pigments. These are particularly useful when molded articles are made, since they increase the body or quantity with only slight increase in cost. Further, some fillers, particularly ground mica, possess high dielectric constants and properties in themselves, and are therefore of considerable value in the manufacture of dielectric compositions generally.

The resinous materials of this invention are also valuable as binding agents and impregnants in the production of refractory ceramic coated wire, as described in copending application, Serial No. 496,978, filed on August 6, 1943, by Robinson and Dorst, since they are durable, resilient, moisture-resistant, and heat-resistant.

Some uses of the polymers of this invention may require somewhat softer or more flexible properties than are inherent in the polymer itself. It is therefore helpful to add thereto plasticizers or mixtures thereof such as ethylacetanilide, camphor, carbon tetrachloride, ethylene dichloride, hexachlorethane, sodium trichloracetate, diphenyl phthalate, dibutyl phthalate, triphenyl phosphate, tricresyl phosphate, chlorinated biphenyls ("Aroclors"), keto aromatic acids, such as methyl benzoylbenzoate, phthalides; substituted phthalides, glycerol, dibenzyl ether, butyl stearate, dixylylethane, paraffin, tritolyl, cresol, diphenylpropane, etc.

Another embodiment of this invention concerns methods of stopping the polymerization reaction and/or controlling the physical and/or chemical characteristics of the polymer. It is contemplated that the polymerization reaction may be stopped by hydrogenation; then the resulting polymer may be halogenated, etc., if desired, to obtain specific properties in the polymer. It may also be desired to nitrate or sulphonate following the hydrogenation to impart special properties to the polymer.

Hydrogenation of a partially polymerized styrene derivative may be advisable when it is desired to obtain a certain molecular weight range, since with many of the compounds of this invention a low or intermediate polymerization will result in a dielectric composition of exceptional properties.

It is further contemplated that this method of altering the polymer could be used to produce polychlorstyrenes by first polymerizing styrene or a mono-chloro styrene; subsequently hydrogenating it; then chlorinating it under proper conditions to give a polystyrene with one or more chlorine atoms on some or all of the rings. Compounds of this type possess unique properties when used in accordance with the preceding instructions hereof.

As many apparently widely different embodiments of this invention may be made without departing from the spirit and scope hereof, it is to be understood that the invention is not limited to the specific embodiments hereof except as defined in the appended claims.

What is claimed is:

1. An electrical conductor insulated with a dielectric composition comprising a polymer of a dihalogenated styrene, the halogen atoms being substituted on adjacent positions in the styrene ring.

2. An electrical conductor insulated with a dielectric composition comprising a polymer of a 3,4 dihalogeno styrene.

3. An electrical conductor insulated with a dielectric composition comprising a polymer of a 3,4 dichloro styrene.

4. An electrical conductor insulated with a dielectric composition comprising a polymer of a 3,4 difluoro styrene.

5. An electrical conductor insulated with a dielectric composition comprising a co-polymer obtained from a substantial amount of a nuclear orthodihalogeno styrene and a dissimilar polymerizable resinous material.

6. An electrical conductor insulated with a dielectric composition comprising a co-polymer of a halogenated styrene and N-vinyl carbazole.

7. An electrical conductor insulated with a dielectric composition comprising a polymer of a member selected from the class consisting of dihalogenated styrenes, the halogen atoms of which are substituted on adjacent positions in the styrene ring, and dihalogenated styrenes, the halogen atoms of which are substituted on opposite positions in the styrene ring.

8. An electrical conductor insulated with a dielectric composition comprising a polymer of a dihalogenated styrene, the halogen atoms being substituted on opposite positions in the styrene ring.

9. An electrical conductor insulated with a dielectric composition comprising a polymer of 2,5 dichlorostyrene.

10. The insulated electrical conductor of claim 7 wherein the insulation contains in addition to the polymer described therein a dielectric compound selected from the class consisting of chlorinated biphenyls and chlorinated naphthalenes.

LESTER A. BROOKS.
MATHEW NAZZEWSKI.

Disclaimer 2,406,319.—*Lester A. Brooks*, Stamford, Vt., and *Mathew Nazzewski*, Adams, Mass. INSULATED ELECTRICAL CONDUCTOR. Patent dated Aug. 27, 1946. Disclaimer filed Dec. 19, 1949, by the assignee, *Sprague Electric Company*.

Hereby enters this disclaimer to claim 9 of said patent and disclaims from the scope of claims 7 and 8 of said patent the subject matter defined by said claim 9.

[*Official Gazette Jan. 24, 1950.*]

What is claimed is:

1. An electrical conductor insulated with a dielectric composition comprising a polymer of a dihalogenated styrene, the halogen atoms being substituted on adjacent positions in the styrene ring.

2. An electrical conductor insulated with a dielectric composition comprising a polymer of a 3,4 dihalogeno styrene.

3. An electrical conductor insulated with a dielectric composition comprising a polymer of a 3,4 dichloro styrene.

4. An electrical conductor insulated with a dielectric composition comprising a polymer of a 3,4 difluoro styrene.

5. An electrical conductor insulated with a dielectric composition comprising a co-polymer obtained from a substantial amount of a nuclear orthodihalogeno styrene and a dissimilar polymerizable resinous material.

6. An electrical conductor insulated with a dielectric composition comprising a co-polymer of a halogenated styrene and N-vinyl carbazole.

7. An electrical conductor insulated with a dielectric composition comprising a polymer of a member selected from the class consisting of dihalogenated styrenes, the halogen atoms of which are substituted on adjacent positions in the styrene ring, and dihalogenated styrenes, the halogen atoms of which are substituted on opposite positions in the styrene ring.

8. An electrical conductor insulated with a dielectric composition comprising a polymer of a dihalogenated styrene, the halogen atoms being substituted on opposite positions in the styrene ring.

9. An electrical conductor insulated with a dielectric composition comprising a polymer of 2,5 dichlorostyrene.

10. The insulated electrical conductor of claim 7 wherein the insulation contains in addition to the polymer described therein a dielectric compound selected from the class consisting of chlorinated biphenyls and chlorinated naphthalenes.

LESTER A. BROOKS.
MATHEW NAZZEWSKI.

Disclaimer 2,406,319.—*Lester A. Brooks*, Stamford, Vt., and *Mathew Nazzewski*, Adams, Mass. INSULATED ELECTRICAL CONDUCTOR. Patent dated Aug. 27, 1946. Disclaimer filed Dec. 19, 1949, by the assignee, *Sprague Electric Company*.

Hereby enters this disclaimer to claim 9 of said patent and disclaims from the scope of claims 7 and 8 of said patent the subject matter defined by said claim 9.

[*Official Gazette Jan. 24, 1950.*]